United States Patent Office 3,492,306
Patented Jan. 27, 1970

3,492,306
PREPARATION OF DI-PYRIDYL KETONES
Cornelius Kennedy Cain, Flourtown, and Joseph Albert Meschino, North Wales, Pa., assignors to McNeil Laboratories, Inc., a corporation of Pennsylvania
No Drawing. Continuation-in-part of application Ser. No. 485,931, Sept. 8, 1965. This application Nov. 3, 1967, Ser. No. 680,299
Int. Cl. C07d 31/32, 31/28; C09k 3/00
U.S. Cl. 260—296                                3 Claims

ABSTRACT OF THE DISCLOSURE

Improved methods of preparing di-2-pyridyl ketone by oxidation of di-2-pyridyl carbinol and of preparing di-2-pyridyl carbinol from pyridyl; said di-2-pyridyl ketone having U.V.-absorbing activity.

---

This is a continuation-in-part application of our co-pending United States application Ser. No. 485,931, filed Sept. 8, 1965, now abandoned.

This invention relates to novel methods of preparing di-2-pyridyl ketone having the formula:

$$\text{Pyr}-\overset{\text{O}}{\underset{\|}{\text{C}}}-\text{Pyr} \qquad (I)$$

wherein Pyr is 2-pyridyl. The di-2-pyridyl ketone (I) absorbs ultraviolet light and, accordingly, can be employed as an effective U.V. screen when incorporated in suitable vehicles such as transparent film-forming compositions and oils. The invention also relates to an improved method of preparing an intermediate, di-2-pyridyl carbinol, used in the synthesis of such ketone.

According to this invention, di-2-pyridyl ketone of Formula I is obtained with relative ease and in excellent yields through oxidation of the corresponding di-2-pyridyl carbinol (II):

$$\text{Pyr}-\overset{\text{OH}}{\underset{\|}{\text{CH}}}-\text{Pyr} \xrightarrow{[\text{O}]} \text{Pyr}-\overset{\text{O}}{\underset{\|}{\text{C}}}-\text{Pyr}$$
$$\text{(II)} \qquad\qquad\qquad \text{(I)}$$

with a suitable oxidizing agent such as, for example, nitric acid, potassium permanganate, molecular oxygen and the like, nitric acid being preferred.

In the literature [J. Prakt. Chem. 10:335–9 (1960)], an α-pyridilic acid rearrangement has been reported which consists of the transformation of α-pyridil in the presence of hydroxyl ions into the salt of an α-hydroxy acid. Subsequent treatment of such salt with acid yields a di-pyridyl carbinol. The reported overall yield, however, of di-pyridyl carbinol thus obtained is relatively poor.

It has now been discovered that di-2-pyridyl carbinol of Formula II and, consequently, the di-2-pyridyl ketone of Formula I, may be obtained from pyridil of the formula Pyr—CO—CO—Pyr, wherein Pyr is as heretofore defined, in surprisingly high yields, generally about 90–95 percent of theoretical, based on the amount of said pyridil initially employed. This is accomplished by reacting said pyridil with alkoxide ion in a suitable anhydrous organic solvent, e.g., anhydrous alkanol, tetrahydrofuran, and the like. Elevated temperatures may be advantageously employed. The alkoxide ion may be obtained from any suitable source, preferably from alkali metal alkoxides. A transformation occurs affording the corresponding pyridilic acid alkyl ester which is then hydrolyzed by treatment with water to the corresponding alkali metal salt of pyridilic acid, which may be isolated by conventional techniques, e.g., filtration, evaporation of solvent, etc. An aqueous solution of the thus hydrolyzed product is then acidified to a pH of about 6 by the addition of a suitable acid, e.g., acetic acid, mineral acids and the like, to form the desired di-2-pyridyl carbinol (II).

The following examples are intended to illustrate, but not to limit, the scope of the present invention.

EXAMPLE I

A mixture of 100 g. (0.47 mole) of 2,2'-pyridyl and 37.8 g. (0.7 mole) of sodium methoxide in 500 ml. of anhydrous methanol is refluxed for a total of 45 minutes. While stirring, 18 g. (1 mole) of water is added. The resulting slurry is then filtered and the filter cake washed with ether. The filtrate is discarded. The white product (sodium 2,2'-pyridilate) is placed in 1 liter of water and while being stirred is treated slowly with 40 g. (0.67 mole) of glacial acetic acid. When the evolution of carbon dioxide ceases, 200 ml. (3.1 moles) of 70% nitric acid is added to the mixture and the temperature brought to about 80° C. to 90° C. for 2 hours. After cooling, the mixture is made basic and extracted several times with methylene chloride. The organic solution is dried over magnesium sulfate and concentrated to dryness yielding 82 g. (95% of theory) of di-2-pyridyl ketone, M.P. 55–56° C.

EXAMPLE II

In accordance with the procedures of the foregoing examples, except that an equivalent quantity of sodium ethoxide in anhydrous ethanol is used instead of sodium methoxide in methanol, high yields of di-2-pyridyl ketone are also obtained.

What is claimed is:

1. A process of preparing di-2-pyridyl ketone of the formula Pyr—CO—Pyr which comprises reacting pyridyl of the formula Pyr—CO—CO—Pyr with alkoxide ion in an anhydrous organic solvent, hydrolyzing the resultant pyridilic acid alkyl ester by treatment with water, acidifying an aqueous solution of the thus hydrolyzed product to a pH of about 6 to form di-2-pyridyl carbinol of the formula Pyr—CH(OH)—Pyr, and oxidizing said carbinol to form said ketone, wherein the foregoing formulas Pyr is 2-pyridyl.

2. The process of claim 1 wherein the anhydrous organic solvent is anhydrous methanol.

3. The process of claim 2 wherein the alkoxide is methoxide.

References Cited

UNITED STATES PATENTS 3,029,244    4/1962    Lyle et al. _____ 260—297 XR

OTHER REFERENCES

Klosa: Chem. Abstracts, vol. 55, par. 14,455–b, 1961.

HENRY R. JILES, Primary Examiner

A. L. ROTMAN, Assistant Examiner

U.S. Cl. X.R.

260—45.8, 295